US008015341B2

United States Patent
Evoy et al.

(10) Patent No.: US 8,015,341 B2
(45) Date of Patent: Sep. 6, 2011

(54) COMMUNICATIONS DEVICE AND METHOD FOR CONFIGURING A COMMUNICATION PORT DEPENDING ON A DIRECTION CONDITION OF A REMOTE DEVICE COMMUNICATIVELY COUPLED TO THE COMMUNICATIONS PORT

(75) Inventors: David R. Evoy, Chandler, AZ (US); Dc Sessions, Phoenix, AZ (US); Dennis Koutsoures, Glendale Heights, IL (US)

(73) Assignee: NXP B.V., Eindhoven (NL)

( * ) Notice: Subject to any disclaimer, the term of this patent is extended or adjusted under 35 U.S.C. 154(b) by 666 days.

(21) Appl. No.: 10/592,190

(22) PCT Filed: Mar. 21, 2005

(86) PCT No.: PCT/IB2005/050967
§ 371 (c)(1),
(2), (4) Date: Oct. 24, 2008

(87) PCT Pub. No.: WO2005/091155
PCT Pub. Date: Sep. 29, 2005

(65) Prior Publication Data
US 2009/0043931 A1    Feb. 12, 2009

Related U.S. Application Data

(60) Provisional application No. 60/554,506, filed on Mar. 19, 2004.

(51) Int. Cl.
*G06F 13/20* (2006.01)
(52) U.S. Cl. .................. 710/316; 710/106; 710/104
(58) Field of Classification Search .......... 710/300–317, 710/8–19, 2, 104–106, 110, 56–61
See application file for complete search history.

(56) References Cited

U.S. PATENT DOCUMENTS

| 4,703,198 A | 10/1987 | Porter et al. |
| 5,761,463 A | 6/1998 | Allen |
| 5,903,613 A | 5/1999 | Ishida |
| 6,795,877 B2 * | 9/2004 | Glenn ............................. 710/36 |
| 7,136,953 B1 * | 11/2006 | Bisson et al. ................. 710/307 |
| 7,219,181 B2 * | 5/2007 | Carty ............................ 710/301 |
| 2005/0182881 A1 * | 8/2005 | Chou et al. .................... 710/301 |
| 2008/0104298 A1 * | 5/2008 | Liu ................................ 710/301 |

FOREIGN PATENT DOCUMENTS

| CN | 1460939 A | 12/2003 |
| EP | 1 248 203 A2 | 10/2002 |
| JP | 2001-168896 A | 6/2001 |

OTHER PUBLICATIONS

International Preliminary Report on Patentability for Int'l. Patent Appln. No. PCT/IB2005/050967 (Sep. 19, 2006).
Satomi, H. "A Complete Study of the High Speed Bus System," Interface magazine, CQ Publ'g. Co., Ltd., cover, pp. 88-19 (2003).

* cited by examiner

*Primary Examiner* — Raymond Phan

(57) ABSTRACT

A communications port is implemented for configuration in direction and arrangement. According to an example embodiment of the present invention, a communications link (110), such as a PCI Express type link, is configurable for communicating with devices having different directional and/or polarity configurations. The communications link is configured to match a communications port condition (e.g., a directional and/or polarity condition) of a device (120) coupled to the communications link. In one instance, the communications link is directionally configurable for reassigning input lanes to output lanes and output lanes to input lanes. With this approach, the communications link can be used to communicate with a variety of devices having varied communication characteristics.

20 Claims, 6 Drawing Sheets

COMMUNICATIONS DEVICE AND METHOD FOR CONFIGURING A COMMUNICATION PORT DEPENDING ON A DIRECTION CONDITION OF A REMOTE DEVICE COMMUNICATIVELY COUPLED TO THE COMMUNICATIONS PORT

CROSS REFERENCE TO RELATED APPLICATION

This application claims the benefit of U.S. provisional application Ser. No. 60/554,506 filed Mar. 19, 2004, which is incorporated herein whole by reference.

The present invention relates generally to communications and, more particularly, to communication methods and arrangements involving communications ports.

Many different types of electronic communications are carried out for a variety of purposes and with a variety of different types of devices and systems. One type of electronic communications system involves those communications associated with BUS-type communications between two or more different components. For instance, computers typically include a central processing unit (CPU) that communicates with peripheral devices via a bus. Instructions and other information is passed between the CPU and the peripheral devices on a communications BUS or other link.

One type of communications approach involves the use of a PCI (Peripheral Component Interconnect) system. PCI is an interconnection system between a microprocessor and attached devices in which expansion slots are spaced closely for high speed operation. Using PCI, a computer can support new PCI cards while continuing to support Industry Standard Architecture (ISA) expansion cards, which is an older standard. PCI is designed to be independent of microprocessor design and to be synchronized with the clock speed of the microprocessor. PCI uses active paths (on a multi-drop bus) to transmit both address and data signals, sending the address on one clock cycle and data on the next. The PCI bus can be populated with adapters requiring fast accesses to each other and/or system memory and that can be accessed by a host processor at speeds approaching that of the processor's full native bus speed. Read and write transfers over the PCI bust are implemented with burst transfers that can be sent starting with an address on the first cycle and a sequence of data transmissions on a certain number of successive cycles. PCI-type architecture is widely implemented, and is now installed on most desktop computers.

PCI Express architecture exhibits similarities to PCI architecture with certain changes. PCI Express architecture employs a switch that replaces the multi-drop bus of the PCI architecture with a switch that provides fan-out for an input-output (I/O) bus. The fan-out capability of the switch facilitates a series of connections for add-in, high-performance I/O. The switch is a logical element that may be implemented within a component that also contains a host bridge. A PCI switch can logically be thought of, e.g., as a collection of PCI-to-PCI bridges in which one bridge is the upstream bridge that is connected to a private local bus via its downstream side to the upstream sides of a group of additional PCI-to-PCI bridges.

In typical PCI Express applications, input and output ports are limited in application to the type and arrangement of components that they can communicate with. Certain components require specific port configurations for communications therewith. For instance, PCB board traces typically must accommodate various pinouts as required to connect inputs to outputs (and outputs to inputs). Package level interconnects require custom integrated circuits (ICs) for specific applications such as flip chip and multi-die applications. In addition, typical PCB routing requires different parts for top and bottom portions of a PCB (e.g., with lane arrays on opposite sides of a PCB having reversed polarity). In this regard, receiver and transceiver components cannot generally be swapped with PCI Express implementations.

These and other limitations present challenges to the implementation of integrated devices with a variety of communications approaches.

Various aspects of the present invention involve communication approaches for a variety of computer circuits, such as those including communication BUS-type structures (e.g., PCI structures) and others. The present invention is exemplified in a number of implementations and applications, some of which are summarized below.

According to an example embodiment of the present invention, a communications device is configurable for transmission and receipt of communications with different directional and/or polarity configurations. When communicating with another device, a condition of communications of the other device is sensed. A communications port is configured as a function of the sensed condition such that the two devices can communicate. The communications port includes, e.g., one or more pairs of pins, each pair of pins being coupled to a communications lane and each lane having a differential pair of signals for sending and receiving communications. With this approach, receiver and transceiver components for a variety of communications arrangements can effectively be swapped. In addition, polarity characteristics of such components can also be swapped, with or without a corresponding swap in receiver and transceiver functions.

According to another example embodiment of the present invention, a communications device includes a communications port that is configurable for communicating in transmit and receive modes. A sensing circuit senses a direction condition of a PCI Express-type device communicatively coupled to the communications port via a PCI Express-type link (e.g., to sense whether the PCI Express-type device is communicating to transmit or receive information). A configuration circuit is adapted to configure the communications port in at least one of the transmit and receive modes as a function of the sensed direction condition.

The above summary of the present invention is not intended to describe each embodiment or every implementation of the present invention. The above summary of the present invention is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which.

Figure 1:
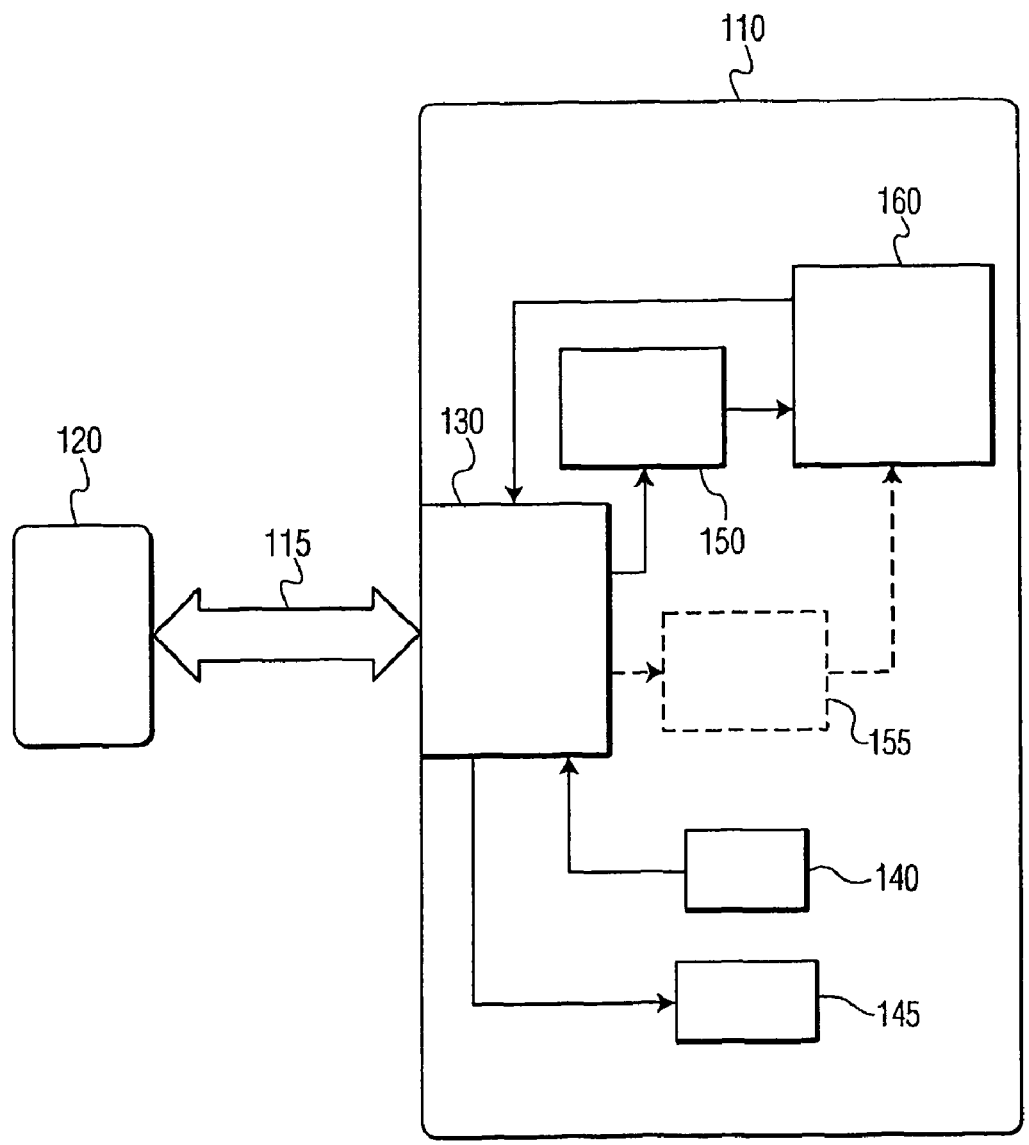
FIG. 1 is an arrangement for communicating via a PCI Express bus, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving electronic communications, and in particular to those involving communications between lanes. While the present invention is not necessarily limited to such applications, an appreciation of various aspects of the invention is best gained through a discussion of examples in such an environment.

According to an example embodiment of the present invention, a communications arrangement is configurable in direction and, in some instances, polarity. One or more input-output (I/O) lane(s) are adapted for communicating via a communications link. Each I/O lane includes at least two pins for coupling to signal wires, with a differential across these pins providing a value for the lane. For instance, a voltage differential across the signal wires can be sensed across the pins, with the sensed voltage being used to provide the value for the lane. The communications arrangement includes a sense circuit coupled to at least one of the I/O lanes and adapted to sense signals at the I/O lane received via the communications link. The I/O lane(s) are configured as a function of the sensed signals to facilitate communications between devices on the communications link. With this approach, the one or more I/O lanes can be implemented for communicating with devices exhibiting different communications configurations, such as directional and/or polar configurations. In addition, this approach has been found useful, for example, when implementing an I/O lane(s) for communications with circuits on both the top and bottom of a PCB or other circuit.

In one implementation, the communications arrangement includes a single I/O lane array that is configurable in both direction and polarity. The I/O lane array is configurable for connection to devices and involving, for example, internal, external, edge connector and top and/or bottom (e.g., of PCB) implementations. When a directional condition (e.g., input or output configuration) of an external device to which the I/O lane array is to communicate with is different than the direction configuration of the I/O lane array, the I/O lane array is reconfigured in direction to match the external device. Similarly, when a polarity condition (e.g., positive/negative orientation) of an external device to which the I/O lane array is to communicate is different than the polarity of the I/O lane array, the I/O lane array is reconfigured to a polarity that matches the external device. That is, output pairs become input pairs and input pairs become output pairs.

Turning now to the figures, FIG. 1 shows a configurable PCI Express communications device 110 adapted to communicate with a remote device 120 (e.g., an external device) using a PCI Express link 115, according to another example embodiment of the present invention. The communications device 110 may be implemented, for example, in connection with a PCI Express device such as an endpoint device, separately or integrated therein. Configurable I/O pads 130 are coupled to the PCI Express link and adapted for sending and receiving information respectively using driver 140 and receiver 145. Coupled to the configurable I/O pads 130 are a driver 140 and receiver 145, a directional sense circuit 150, a configuration circuit 160 and an optional polarity sense circuit 155. In various implementations, one or more of the components in the communications device 110 are integrated physically and/or functionally. In addition, the remote device 120 can be implemented with one or more remote devices adapted to communicate via the PCI Express link 115. Furthermore, one or more of the components in the communications device 110 can be implemented using software to emulate the expressed functionality.

The directional sense circuit 150 is adapted to sense, at the configurable I/O pads 130, a directional condition of a signals from the remote device 120 present on the PCI Express link 115. An output from the directional sense circuit 150 is used by the configuration circuit 160 to configure the configurable I/O pads 130 to directionally match the remote device 120. The directional sense circuit 150 is thus implemented for detecting whether the remote device 120 (or a portion thereof) is communicating with an input lane, output lane and/or auto direction sense lanes.

When the remote device 120 includes a driver, signals from the driver are sensed by the directional sense circuit 150 as a load on the configurable I/O pads 130. The configuration circuit 160 uses this load to set the configurable I/O pads 130 for receiving input from the remote device 120. Correspondingly, the receiver 145 is implemented and used, for example, to process signals received from the remote device 120 and/or to pass the signals to another component, such as a PCI Express endpoint device.

When the remote device 120 is adapted to receive information, the directional sense circuit 150 senses characteristics indicative thereof (e.g., lack of a load). The configuration circuit 160 uses these characteristics to set the configurable I/O pads 130 for sending outputs to the remote device 120. Correspondingly, the driver 140 is implemented and used, for example, to generate signals to be sent to the remote device 120 via the configurable I/O pads 130.

The configurable I/O pads 130 can be implemented using a variety of approaches, and optionally includes circuitry for routing or otherwise coupling signals for input and/or output conditions. In some implementations, the configurable I/O pads 130 includes multiple I/O lanes coupled to the communications link 115 for passing signals with the remote device 120. For example, a four-lane arrangement as shown in FIGS. 2A-D and 3A-3C may be implemented in connection with the configurable I/O pads 130. In other implementations, the configurable I/O pads 130 are functionally implemented via control executed, for example, by the configuration circuit 160. This functional implementation may involve configuration of the driver 140 and receiver 145 with I/O pads that is generally indifferent to the configuration. In this regard, the above-discussed directional sensing approach can be implemented for setting the two or more I/O lanes for input or output purposes. For example, the directional sense circuit 150 can be coupled to one of the I/O lanes to sense directional conditions from the remote device 120, with the corresponding direction being used to configure all of the I/O lanes.

In other implementations, the configurable I/O pads 130 include two or more sets of lanes, each set being separately configurable in direction and, in some instances, polarity. In this regard, different sets of lanes can be configured with different directional and/or polarity characteristics, using one or more of the directional sense circuit 150 and the polarity sense circuit 155. Each of these sets of lanes can be accordingly used to send or receive information from one or more remote devices. FIGS. 2A-2D and 3A-3C show various example lane configurations that may be implemented, for example, using this approach involving two or more sets of lanes in connection with the configurable I/O pads 130 and a device with which the I/O pads are communicating.

In another implementation, the polarity sense circuit 155 is implemented and used to sense a polarity condition of signals (i.e., positive or negative polarity) from the remote device 120 present on the PCI Express link 115. The configuration circuit 160 uses an output from the polarity sense circuit 155 to configure the configurable I/O pads 130 to match the polarity of the remote device 120. For instance, where the polarity is opposite the set polarity of the configurable I/O pads 130 and sensed by the polarity sense circuit 155, the configuration circuit 160 responds by reversing the polarity of the configurable I/O pads (e.g., by reversing lane connections). The lane connections may be reversed by, for example, controlling a switching arrangement within the configurable I/O pads 130.

In another implementation, the configurable I/O pads 130 include input and output pads that both have output stages. The output pads are implemented with a receiver configuration (i.e., with receiver 145) to terminate the receiver at the pads. These terminating output pads are used for configuration in an output direction of the configurable I/O pads 130 with the configuration circuit 160.

The directional sense circuit 150 can be operated using various approaches. One such approach involves using the directional sense circuit 150 to initiate a conventional PCI Express-type detection sequence for detecting the presence of signals from the remote device 120. If signals are detected, communication lanes are negotiated with the remote device 120 and the configurable I/O pads 130 are maintained in their configured state. If the directional sense circuit 150 fails to sense signals (and thus lanes are not negotiated), inputs and outputs at the configurable I/O pads 130 are swapped, a reset is released and the directional sense circuit 150 tries again with a detection sequence. With this approach, proper configuration of the configurable I/O pads 130 is facilitated by simply detecting whether communications can be established with the remote device; if communications cannot be established, the configurable I/O pads 130 are switched into another (e.g., opposite) configuration.

The approach discussed in the previous paragraph is useful for a variety of configuration approaches involving, for example, both directional and polar configuration. For instance, the polarity sense circuit 155 can be operated to facilitate detecting the ability for establishing communications with the remote device 120. If a PCI Express detection sequence results in the detection of signals indicating that communications can be established with the remote device 120, a polarity configuration of the configurable I/O pads 130 is maintained. If communications cannot be established, a polarity configuration of the configurable I/O pads 130 is switched and communications are again attempted with the remote device 120. The process of running the PCI Express detection sequence and switching polarity can be carried out until communications are established.

In another implementation, the operational approaches discussed in the previous two paragraphs are combined. The directional sense circuit 150 and polarity sense circuit 155 are combined with a circuit that detects whether communications with the remote device 120 can be established. If communications can be established, the configuration of the configurable I/O pads 130 (or selected lanes thereof) is maintained. If communications cannot be established, multiple detection sequence iterations are performed with different directional and/or polarity configurations. For instance, with two different directional (send and receive) and two polar (positive and negative) configurations possible, four combined configurations (send/positive, send/negative, receive/positive, receive/negative) are possible. These configurations are sequentially implemented until communications with the remote device 120 are established. With this approach, an actual direction or polarity of the remote device 120 does not necessarily have to be detected.

The configurable PCI Express communications device 110 is further adapted for power-saving operation in connection with another implementation. An idle-type state is detected when one or more components of the PCI Express communications device 110 is not needed. For instance, when the driver 140 is active, the receiver 145 can be disabled. Similarly, when the receiver 145 is active, the driver 140 can be disabled. In other instances, the configuration of the I/O pads 130 is functionally effected by selectively enabling (and/or disabling) components of the PCI Express communications device 110 (e.g., driving or receiving modes are effected by respectively powering the driver 140 or the receiver 145).

FIGS. 2A-2D show approaches to lane-to-lane connections between PCI Express devices, according to various example embodiments of the present invention. The connections shown in FIGS. 2A-2D may be implemented, for example, in connection with the approach and arrangement described in connection with FIG. 1. In addition, one or more of the approaches shown in FIGS. 2A-2D may be implemented together on a single PCI Express device. Furthermore, in some instances, each of the ports shown for each device in FIGS. 2A-2D may be functionally implemented with a single port and configuration for achieving the communications as shown.

Figure 2A:
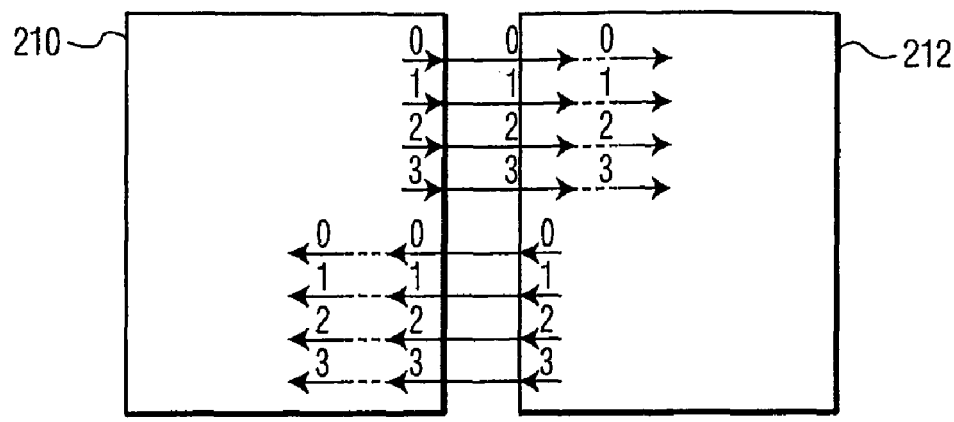
FIGS. 2A-2D show lane-to-lane connections between a configurable PCI Express communications link and a PCI Express device, according to various example embodiments of the present invention.

Beginning with FIG. 2A, a first PCI Express device 210 is coupled with a second PCI Express device 212 using a normal (direct, not reversed) lane assignment connection. Outputs from each device 210 and 212 are respectively received at the other device without configuration (i.e., with lanes 0, 1, 2 and 3 in each device respectively coupled to the same lane in the other device).

Figure 2B:
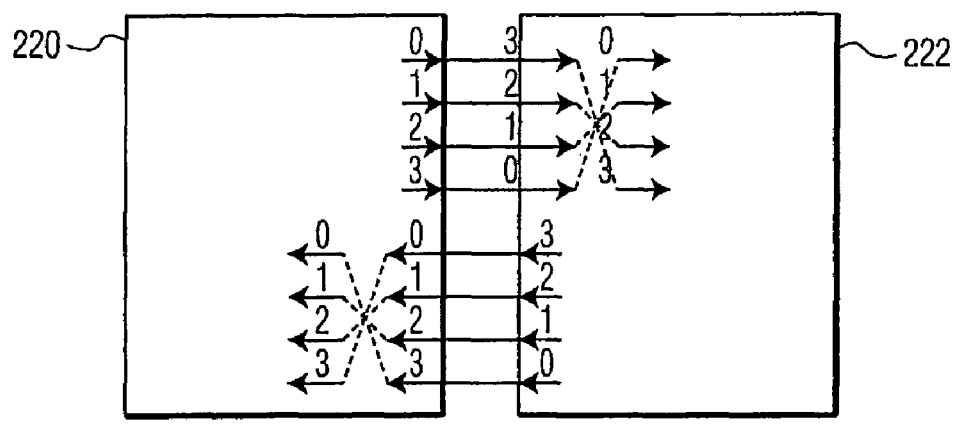

FIG. 2B shows first (220) and second (222) PCI Express devices connected with corresponding lane assignments for each device being reversed for receiving information from the respective other device. Outputs from each device 220 and 222 are respectively received and reversed at the other device (i.e., with lanes 0, 1, 2 and 3 being respectively switched with lanes 3, 2, 1 and 0).

Figure 2C:
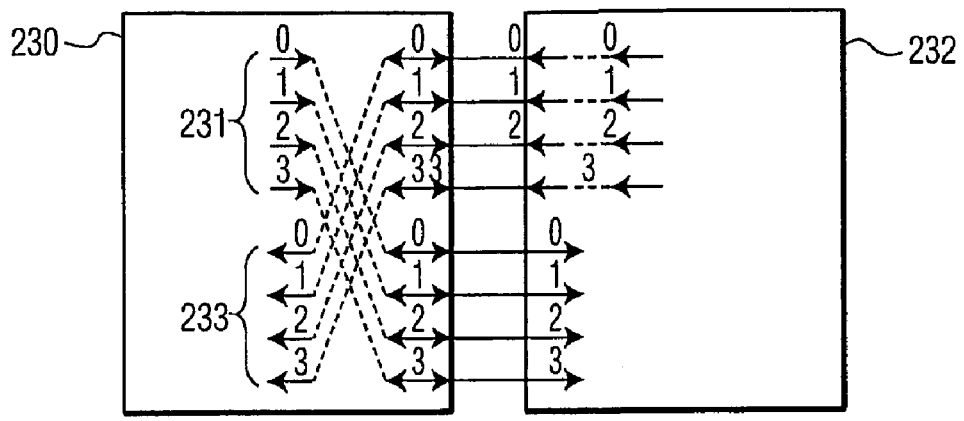

FIG. 2C shows first (230) and second (232) PCI Express devices with the first PCI Express device having reverse-direction-connected ports. Inputs received at port 231 of device 230 are switched to port 233, and outputs sent from port 231 are switched with an output at port 233. In this instance, the lanes are not reversed in connection.

Figure 2D:
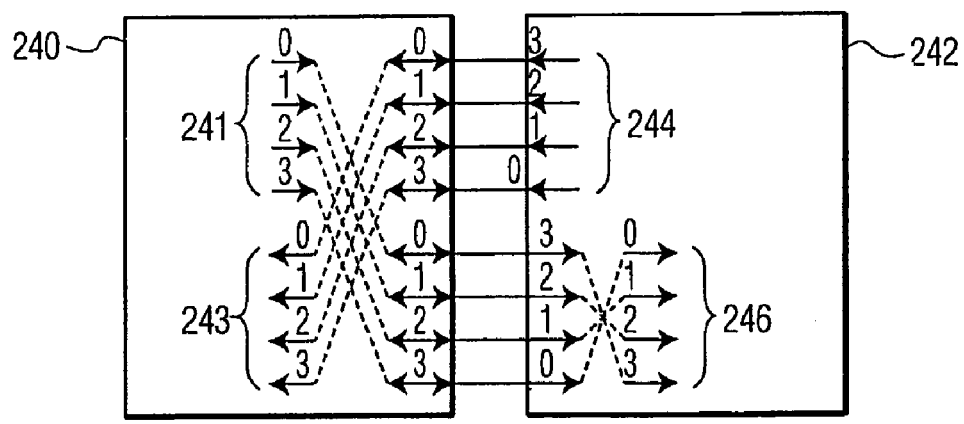

FIG. 2D shows first (240) and second (242) PCI Express devices with the first PCI Express device 240 having ports 241 and 243 coupled for reversing direction and lane assignment of inputs and outputs. The second PCI Express device 242 has a port 246 coupled for reversing lane assignment (for signals received from port 244 of device 240). Inputs received at port 241 of device 240 are switched to port 233 with lanes 0, 1, 2 and 3 as received from port 244 being respectively reversed to lanes 3, 2, 1 and 0. Outputs sent from port 241 are switched with an output at port 243. These outputs sent via port 243 are reversed in lane assignment at port 246, with outputs on lanes 0, 1, 2, and 3 as received from port 243 being respectively reversed to lanes 3, 2, 1 and 0 at port 246.

Figure 3A:
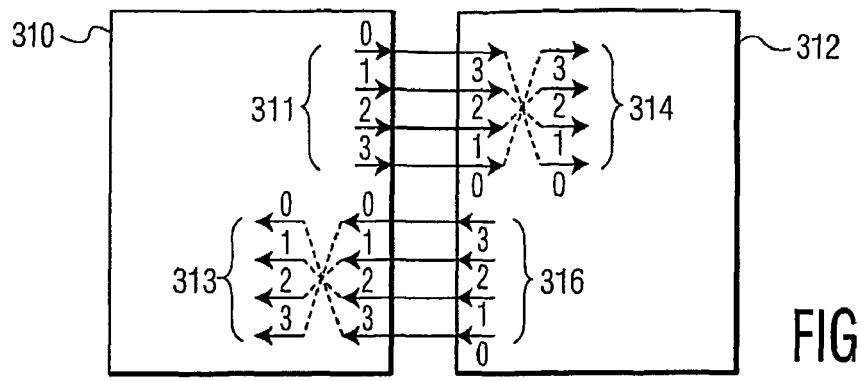
FIGS. 3A-3C show lane-to-lane connections between a configurable PCI Express communications link and a PCI Express device, according to various example embodiments of the present invention.
Figure 3B:
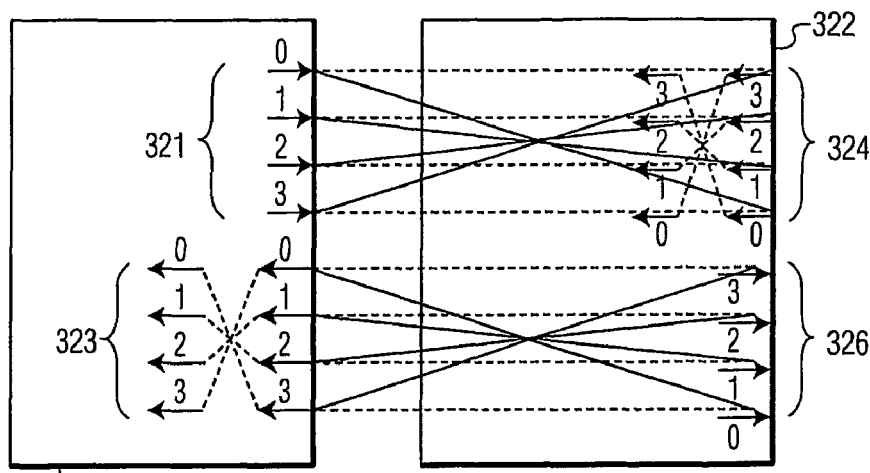
Figure 3C:
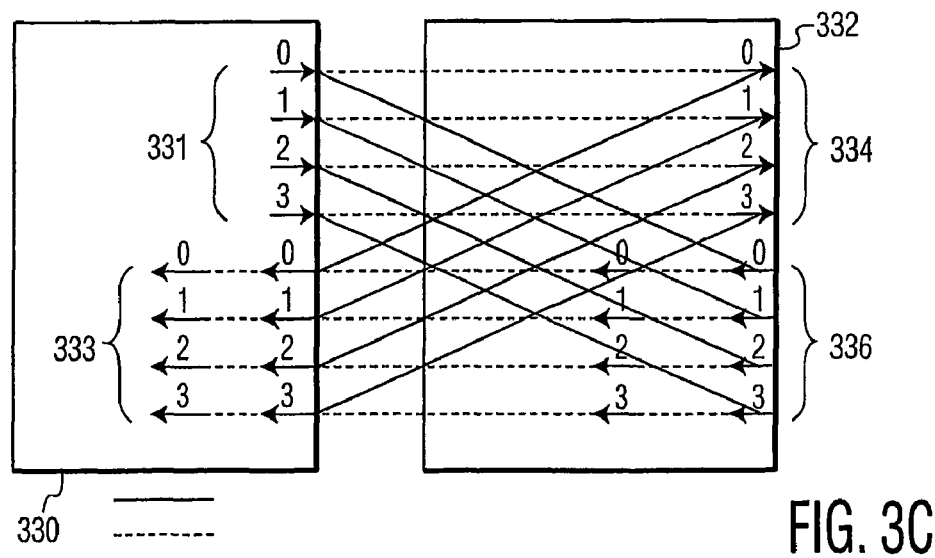

FIGS. 3A-3C show approaches to lane-to-lane connections between PCI Express devices, according to various example embodiments of the present invention. The connections shown in FIGS. 3A-3C may be implemented, for example, in connection with the approach and arrangement described in connection with FIG. 1. In addition, one or more of the approaches shown in FIGS. 3A-3C may be implemented together (and, in some instances, with one or more of the approaches shown in FIGS. 2A-2D) on a single PCI Express Device. Furthermore, in some instances, each of the ports shown for each device in FIGS. 3A-3C may be functionally implemented with a single port and configuration for achieving the communications as shown.

Beginning with FIG. 3A, two PCI Express devices 310 and 312 are coupled with ports that are rotated relative to one another. Output port 311 of device 310 is coupled to input port 314 of device 312, with lanes 0, 1, 2 and 3 of the output port 311 being rotated to correspond to similar lanes in device 312. Similarly, output port 316 of device 312 is coupled to input port 313 of device 310, with lanes 0, 1, 2 and 3 of the output port 316 being rotated to correspond to similar lanes in device 310.

FIG. 3B shows two PCI Express devices 320 and 322 for implementation in a front/back printed circuit board (PCB), or face-on-face configuration. In addition, the connections are shown in two configurations; with and without auto reverse, respectively shown with solid and dashed lines. For the implementation with auto reverse, outputs from port 321 of device 320 are coupled to inputs of port 324 with automatically reversed lane assignments. For the implementation without auto reverse, outputs from port 321 are received at port 324 and reversed in lane assignment. Outputs from port 326 are similarly passed to port 323.

FIG. 3C shows two PCI Express devices 330 and 332 for implementation in a same-side configuration (e.g., with the devices being located on the same side of a PCB). In addition, the connections are shown in two configurations; with and without direction-adapting I/O, respectively shown with dashed and solid lines. For the implementation without direction-adapting I/O, outputs from port 331 of device 330 are coupled to inputs of port 336. For the implementation with direction-adapting I/O, outputs from port 331 are received at port 334 (which is changed from an output configuration to an input configuration; hence, direction-adapting I/O is implemented). Outputs from port 336 are similarly passed to one of ports 331 and 333.

Figure 4:
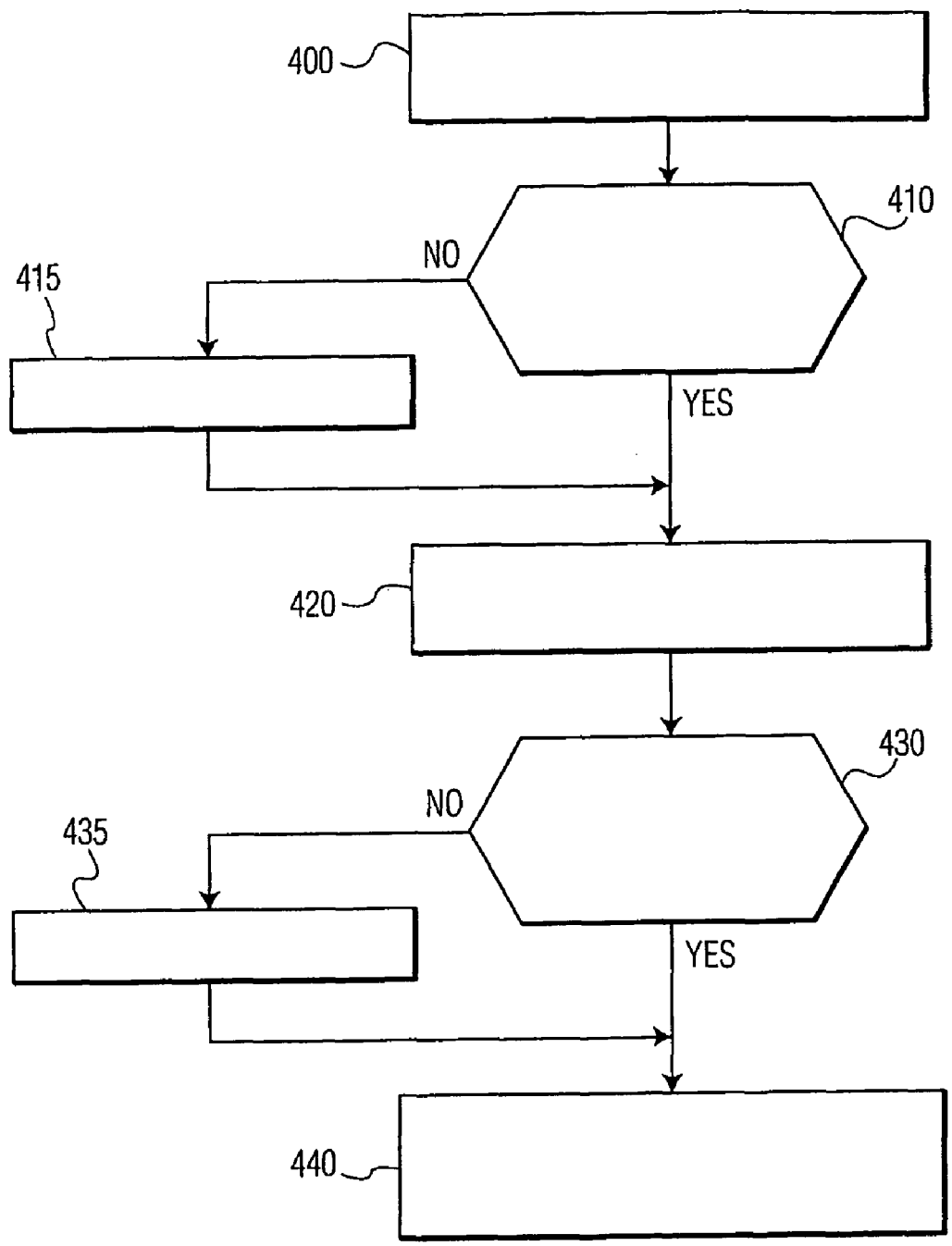
FIG. 4 is a flow diagram showing an approach for automatic sensing and control for PCI Express communications, according to another example embodiment of the present invention.

FIG. 4 is a flow diagram showing an approach for automatic sensing and control for PCI Express-type communications, according to another example embodiment of the present invention. The approach shown in and discussed in connection with FIG. 4 may be implemented using one or more of the approaches to connectivity and communications shown in FIGS. 2A-2D and 3A-3C. At block 400, a direction condition is sensed from a downstream PCI Express-type device at an I/O lane. If the direction condition does not match the direction of the I/O lane at block 410, the I/O lane direction is reversed at block 415. If the direction condition matches the direction of the I/O lane at block 410 (or after the I/O lane direction is reversed at block 415), a polarity condition is sensed from the downstream device at block 420. If the polarity condition does not match a direction of the I/O lane at block 430, the polarity of the I/O lane is reversed at block 435. If the polarity condition matches the direction of the I/O lane at block 430 (or if the polarity has been reversed at block 435), communications are effected with the downstream device using the I/O lane with matching direction and polarity at block 440.

Figure 5:
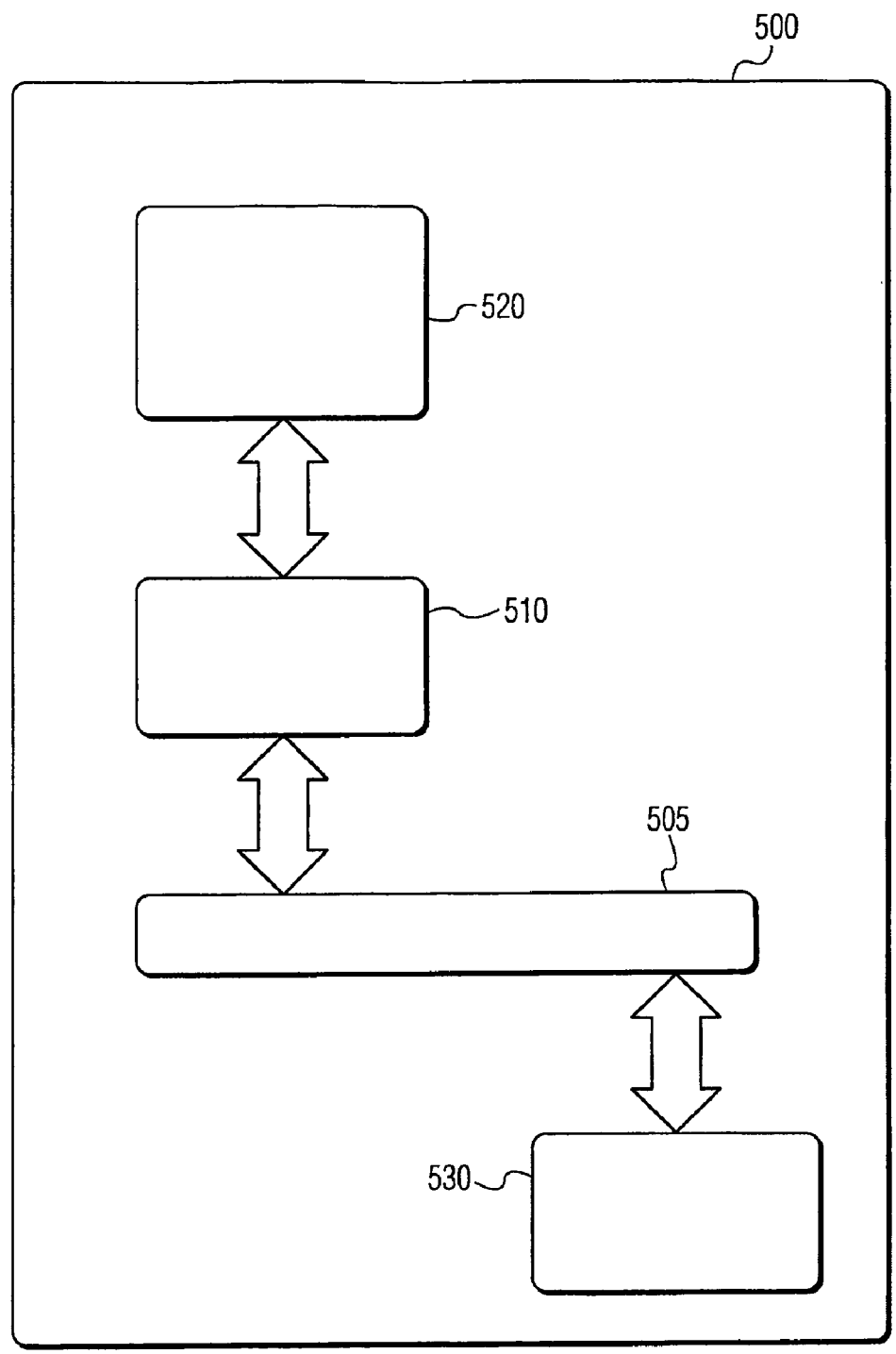
FIG. 5 shows a system including a CPU, PCI Express bus and PCI Express devices with a configurable PCI Express communications link, according to another example embodiment of the present invention.

FIG. 5 shows a computer system 500 with a configurable PCI Express communications device 510, according to another example embodiment of the present invention. A plurality of ports including an upstream port 520 and a downstream port 530, exist on a PCI Express bus 505. The PCI Express communications device 510 is coupled and configured with the upstream port 520 to detect port settings of the downstream port 530 (as well as other ports) on the PCI Express bus 505 for facilitating communications with the upstream port. The PCI Express communications device 510 may be configurable, for example, in a manner similar to the PCI Express communications device 110 in FIG. 1. For instance, by detecting a directional condition of the downstream port 530, the PCI Express communications device 510 is configured in a communications mode that matches the directional condition of the downstream port.

In one implementation, one or more of the upstream port 520 and the downstream port 530 is configured with a listen phase and a driving phase. For instance, the downstream port 530 could listen on all lanes while the upstream port 520 starts a detect sequence. The downstream port 530 starts a detect sequence after it determines (e.g., by detecting a load on its driver) that some of its inputs are being detected by the upstream port 520.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, one or more of the above example embodiments and implementations may be implemented with a variety of PCI Express devices and other approaches, including chips and printed circuit boards (PCBs). For example, the above example embodiments and implementations may be integrated with a variety of circuits, devices, systems and approaches including those for use in connection with storage, display, networking and mobile communications. In addition, various embodiments discussed in the context of PCI and PCI Express type applications may be implemented using a variety of devices and communications approaches, including those not necessarily applicable to PCI or PCI Express. These approaches are implemented in connection with various example embodiments of the present invention. Such modifications and changes do not depart from the true spirit and scope of the present invention that is set forth in the following claims.

What is claimed is:

1. A communications device comprising: a communications port including at least one pair of pins configurable for transmitting and receiving differential signals over a communications lane; a sensing circuit configured to sense, as a function of a differential signal across at least one pair of the pins, a communications direction condition of a remote device communicatively coupled to the communications port; and a configuration circuit configured to configure the communications port in at least one of transmit and receive modes as a function of the communications direction condition sensed by the sensing circuit such that a communications direction condition of the communications port matches the communications direction condition of the remote device.

2. The device of claim 1, wherein the configuration circuit is configured to configure the communications port to communicate with the remote device.

3. The device of claim 1, wherein the configuration circuit is configured to configure the communications port to receive communications from the remote device in response to the sensing circuit sensing the communications direction condition that is indicative of the remote device communicating via an output lane.

4. The device of claim 1, wherein the configuration circuit is configured to configure the communications port to send communications to the remote device in response to the sensing circuit sensing the communications direction condition that is indicative of the remote device communicating via an input lane.

5. The device of claim 1, wherein the sensing circuit is configured to sense a polarity condition of the remote device via a pair of the pins and wherein the configuration circuit is configured to configure the communications port as a function of the sensed polarity condition such that a polarity condition of the communications port matches the sensed polarity condition of the remote device.

6. The device of claim 1, wherein the communications port includes at least two communications lanes, each lane having a pair of the pins assigned thereto, wherein the sensing circuit is configured to sense a lane assignment condition of the remote device via the communications port and wherein the configuration circuit is configured to configure the communications lanes as a function of the lane assignment condition.

7. The device of claim 1, wherein the communications port is configured with each of its pairs of pins coupled across two wires of a communications lane, wherein the sensing circuit is configured to detect a voltage differential across the two wires and to sense the communications direction condition as a function of the sensed voltage differential.

8. The device of claim 1, wherein the communications port includes at least two pairs of communications pins, each pair of communications pins being configured for communicating via a dedicated communications lane, wherein the sensing circuit is coupled to one of the at least two pairs communications pins for sensing a direction condition of an associated communications lane therefrom and wherein the configuration circuit is configured to configure all of the communications pins in at least one of the transmit and receive modes as a function of the direction condition sensed from the associated communications lane.

9. The device of claim 5, wherein the configuration circuit is configured to reverse connections between at least one pair of the communications pins and the remote device in response to the polarity condition indicating that the polarity of the remote device is opposite the polarity of the at least two communications pins.

10. The device of claim 7, further comprising a local device coupled to the communications port for communicating data with the remote device as a function of the voltage differential across the two wires.

11. For communications with a remote PCI Express device over a PCI Express communications link, a configurable PCI Express communications device comprising: a communications port for communicating with a remote PCI Express device over the PCI Express communications link in transmit and receive modes, the communications port including at least one communications lane having a pair of pins, a differential across the pins being implemented for communicating informational signals; a driver coupled to the communications port and configured to generate signals for passing to a remote PCI Express device on at least one of the communications lanes via the communications link; a receiver coupled to the communications port and configured to receive signals from a remote PCI Express device on at least one of the communications lanes via the communications link; a sensing circuit configured to sense a communications direction condition of a remote PCI Express device communicatively coupled to the communications port via the PCI Express-type link by sensing a voltage differential across a pair of pins for one of the communications lanes; and a configuration circuit configured to configure the driver, receiver and communications port in at least one of the transmit and receive modes as a function of the communications direction condition sensed by the sensing circuit such that a communications direction condition of the communications port matches the communications direction condition of the remote PCI Express device.

12. The device of claim 11, wherein the sensing circuit is further configured to sense a polarity condition of a remote PCI Express device on one of the communications lanes and wherein the configuration circuit is further configured to configure the driver, receiver and at least one of the communications lanes to a polarity as a function of the polarity condition sensed by the sensing circuit such that a polarity condition of the communications port matches the sensed polarity condition of the remote PCI Express device.

13. The device of claim 11, wherein the sensing circuit is further configured to sense a lane assignment condition of a remote PCI Express device on one of the communications lanes and wherein the configuration circuit is further configured to configure the communications port to a lane assignment as a function of the lane assignment condition sensed by the sensing circuit.

14. The device of claim 11, wherein the sensing circuit is further configured to sense an idle condition of communications on one of the communications lanes and wherein the configuration circuit is further configured to configure the driver, receiver and communications port as a function of the idle condition sensed by the sensing circuit.

15. The device of claim 14, wherein the configuration circuit is configured to selectively power the driver and receiver as a function of the sensed idle condition.

16. A data handling system comprising: a PCI Express link; a central processing unit (CPU) coupled with the PCI Express link; first and second PCI Express devices coupled to the PCI Express link and configured to communicate with each other and the CPU via the PCI Express link; and at least one configurable communications lane coupled to the second PCI Express device and configured for operation in transmit and receive modes as a function of a directional communications characteristic of the first PCI Express device, for facilitating communications between the first and second PCI Express devices such that a directional communications characteristic of the at least one configurable communications lane matches the directional communications characteristic of the first PCI Express device.

17. A communications device comprising: a communications port including at least one pair of pins configurable for transmitting and receiving differential signals over a communications lane; sensing means configured for sensing, as a function of a differential signal across at least one pair of the pins, a communications direction condition of a device communicatively coupled to the communications port; and configuration means configured to configure the communications port in at least one of transmit and receive modes as a function of the communications direction condition sensed by the sensing means such that a communications direction condition of the communications port matches the communications direction condition of the device.

18. For use with a communications port configurable including at least one pair of pins configurable for transmitting and receiving differential signals over a communications lane, a method for communications comprising: sensing, as a function of a differential signal across at least one pair of the pins, a direction condition of a remote device communicatively coupled to the communications port; and configuring the communications port in at least one of transmit and receive modes as a function of direction condition sensed by the sensing circuit such that a communications direction condition of the communications port matches the communications direction condition of the remote device.

19. The method of claim 18, further comprising sensing a polarity condition of the remote device as a function of a differential signal across at least one pair of the pins, wherein configuring the communications port includes configuring the communications port to a polarity as a function of the sensed polarity condition such that a polarity condition of the communications port matches the sensed polarity condition of the remote device.

20. The method of claim 18, further comprising sensing a lane assignment condition of the remote device, wherein configuring the communications port includes assigning lanes to pins of the communications port as a function of the sensed lane assignment.

* * * * *